(12) United States Patent
Kennett et al.

(10) Patent No.: US 9,353,912 B2
(45) Date of Patent: May 31, 2016

(54) METHOD AND SYSTEM FOR REFUELLING

(71) Applicants: Richard Kennett, Summit, NJ (US);
Michael Ciotti, New York, NY (US)

(72) Inventors: Richard Kennett, Summit, NJ (US);
Michael Ciotti, New York, NY (US)

(73) Assignee: Linde Aktiengesellschaft, Munich (DE)

( * ) Notice: Subject to any disclaimer, the term of this patent is extended or adjusted under 35 U.S.C. 154(b) by 483 days.

(21) Appl. No.: 13/910,315

(22) Filed: Jun. 5, 2013

(65) Prior Publication Data

US 2014/0364999 A1    Dec. 11, 2014

(51) Int. Cl.
*F17C 5/00*    (2006.01)

(52) U.S. Cl.
CPC .......... *F17C 5/007* (2013.01); *F17C 2205/0326* (2013.01); *F17C 2205/0385* (2013.01); *F17C 2221/012* (2013.01)

(58) Field of Classification Search
CPC ............... F17C 2221/012; F17C 2205/0326; F17C 2205/0385; F17C 5/007

USPC ........ 141/236, 237, 242–244, 302, 305, 382, 141/1, 2, 21, 89, 197
See application file for complete search history.

(56) References Cited

U.S. PATENT DOCUMENTS

| | | | | |
|---|---|---|---|---|
| 5,088,436 A | * | 2/1992 | Stritmatter | F17C 5/02 137/263 |
| 2009/0139545 A1 | * | 6/2009 | Rowlands | B60S 3/00 134/18 |
| 2009/0294470 A1 | * | 12/2009 | Lampe | F17C 5/02 221/1 |

* cited by examiner

*Primary Examiner* — Mark A Laurenzi
*Assistant Examiner* — Timothy P Kelly
(74) *Attorney, Agent, or Firm* — Philip H. Von Neida

(57) ABSTRACT

A dispensing system and a method for dispensing a fluid such as hydrogen to a hydrogen powered vehicle. The dispensing system contains a source of fluid, a valve block, a programmable logic controller and a dispenser. The dispensing system can be expandable by including a second valve block which during normal operation remains closed. When the operator desires to add a second dispenser, the second valve block is opened and connects the fluid source with the second dispenser. The dispensing system can be set up and operated as set up and operated both indoors and outdoors.

6 Claims, 1 Drawing Sheet

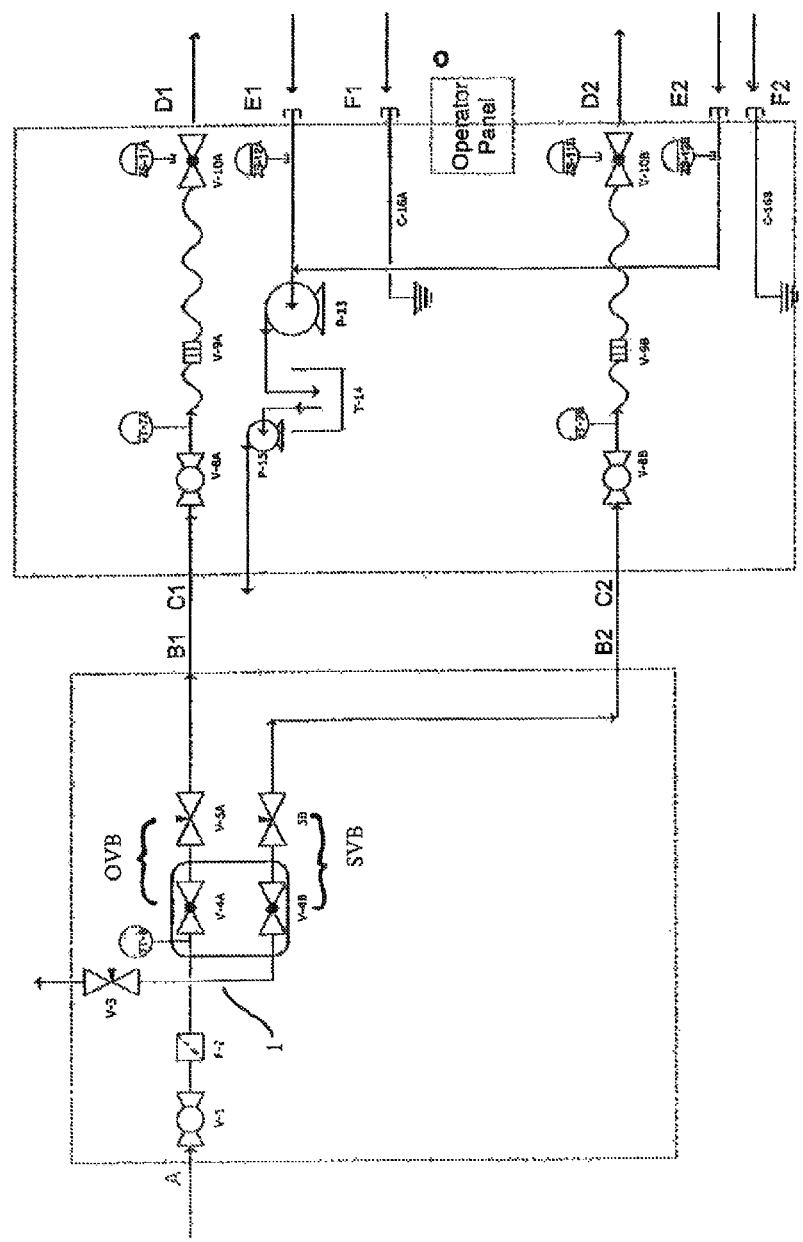

METHOD AND SYSTEM FOR REFUELLING

BACKGROUND OF THE INVENTION

When dispensing hydrogen to vehicles, a certain base infrastructure is required to safely and accurately deliver the product from a source of hydrogen stored at high pressure to the tank of the vehicle being fuelled. In general, this equipment includes tubing, valves to stop or meter the hydrogen flow, process measurement devices, mechanism for holding the fueling hose and removing water from the vehicle and an electrical panel that controls the system and acts as a user interface.

For every additional location or point where hydrogen is needed, an exact duplicate of the base infrastructure is required so two dispensing systems would require twice the base infrastructure. Additionally, whether refueling occurs indoors or outdoors would mandate a change to the system based on environment conditions.

In general, combining the functions of two dispensers into one filling point allows for multiple advantages including but not limited to the reduction of floor space for the equipment, reduction of capital equipment and the possibility to upgrade the system from one filling point to two filling points with little extra work required.

An additional concern with respect to a dispenser with one filling point is a hose that is external to the dispenser. This hose can be run over by the vehicle that is to be filled, can leak through fittings, create problems with tripping, damage through abrasion and injury if the hose breaks during use or even in the idle state.

Water can also be an issue as it can be present in the vehicle fuel tank and will need to be removed to ensure proper operation of the vehicles as well as avoiding corrosion in the fuel tank. The water removal process can be an issue when dispensers are located outdoors and freezing of the liquid in the hose and removal pumps can occur. Additionally, dispensers that are used outdoors need protection from the elements, insects, animal, temperatures and even sunlight.

Controlling the entire dispensing process is a programmable logic controller (PLC) located in an operator panel several feet away from the dispenser in an electrically non-hazardous area. The operator panel is the user interface to the system and contains the logic behind the dispensing process, maintains safe functionality and allows for the system to be started and stopped while logging data. Between these three devices, there are multiple conduits that contain electrical wires all add to system costs and installation time.

When two filling points are required, then double the equipment is required. This increases risk and problems with safety as now there is twice the number of potential leak points. Further there is twice the capital cost and a longer installation and commissioning time as well as increased maintenance costs due to the additional number of parts. The customer site also is affected as more space is used to with two dispensing ports. The dispensers themselves also have the limitation of having the fueling hose on only one side of the dispenser thereby limiting fueling to one side absent pulling the hose across the vehicle.

As such, there is a need for a dispenser that will overcome the difficulties presented by current dispenser setups and operation. The system of the invention will have less equipment and less leak points meaning that the system will be inherently safer. The use of less equipment for the same purposes will allow for a smaller footprint at the customer end user site. By using less equipment, there will be a corresponding decrease in the number of spare parts required. A single operator panel can be used to control both dispensing systems reducing costs and a single pump system can be employed at removing water from more than one vehicle.

SUMMARY OF THE INVENTION

In one embodiment of the invention there is disclosed a dispensing system comprising:
A source of fluid;
At least one valve block;
At least one programmable logic control means; and
At least one dispensing means.

The fluid is preferably hydrogen but can also be selected from the group consisting of compressed natural gas, biogas and a mixture of hydrogen and another gas.

The at least one valve block comprises one or more valves for controlling the flow of the fluid.

The programmable logic control means controls the flow of the fluid between the at least one valve block and the at least one dispensing means but can also control the flow to two dispensing means.

The at least one dispensing means is a hose assembly for delivering the fluid to a vehicle. The at least one dispensing means can be two dispensing means.

The dispensing system can further comprise a pump system for removing water from a vehicle that will be provided with the fluid.

The dispensing system can be set up and operated from a location selected from the group consisting of indoors and outdoors.

In another embodiment of the invention, there is disclosed a dispensing system comprising:
A source of fluid;
A valve block;
A programmable logic control means;
A dispensing means; and
Means to expand the dispensing means to two or more dispensing means.

In this embodiment, the means to expand the dispensing means to two or more dispensing means comprises means to expand the valve block. The means to expand the valve block comprises one or more valves that are closed off. The one or more valves that remain closed off connect to a second valve block. The second valve block connects to a second dispensing means. During normal operation, the second valve block will remain closed and there will be only one dispensing point. Should the operator desire to have a second dispensing point and expand the capacity for fueling vehicles, then this second valve block can be opened and it can provide fluid to the second dispensing device.

The dispensing system can be set up and operated from a location selected from the group consisting of indoors and outdoors.

In another embodiment of the invention there is disclosed a method for feeding a fluid to a vehicle comprising the steps:
Feeding the fluid to a valve block wherein the valve block is in fluid communication with a second valve block and a dispenser;
Opening the valve block to allow for the passage of the fluid to the dispenser while maintaining the second valve block closed; and
Feeding the fluid from the dispenser to the vehicle.

The fluid is preferably hydrogen but can also be selected from the group consisting of compressed natural gas, biogas and a mixture of hydrogen and another gas.

The at least one valve block comprises one or more valves for controlling the flow of the fluid.

The programmable logic control means controls the flow of the fluid between the at least one valve block and the at least one dispensing means but can also control the flow to two dispensing means.

The at least one dispensing means is a hose assembly for delivering the fluid to a vehicle. The at least one dispensing means can be two dispensing means.

The dispensing system can further comprise a pump system for removing water from a vehicle that will be provided with the fluid.

The dispensing system can be set up and operated from a location selected from the group consisting of indoors and outdoors.

BRIEF DESCRIPTION OF THE DRAWINGS

The FIGURE is a schematic of a hydrogen dispenser according to the invention showing a two dispenser operation for fueling two vehicles.

DETAILED DESCRIPTION OF THE INVENTION

Turning to the FIGURE, there is disclosed a schematic of a hydrogen filling system for filling two vehicles.

The hydrogen filling system can be employed for a variety of self-propelled conveyances for transporting people or goods such as by way of example cars, trucks, motorcycles, boats, jet skis and fork lift trucks.

The maximum working pressure of the system is about 10,000 psig. The maximum nominal dispensing pressure is 350 bar and the hydrogen is typically at a medium temperature operating range of $-40°$ to $50°$ C. The equipment temperature operating range is $-40°$ to $35°$ C. Hydrogen from a source (not shown) is fed into the valve panel through line A to a first isolation ball valve V-1 and filter F-2 which will filter out any impurities and particles that may be present in the hydrogen. The purified hydrogen continues through line A to valve V-4A and valve V-5A in a system where there is only one dispenser of hydrogen to the vehicle.

Valves V-4A and V-5A (one valve block or the valve block "OVB") are manipulated as on or off depending upon whether the dispenser is actively dispensing hydrogen or not. A temperature transmitter TT-6 is employed to measure the temperature of the hydrogen at this point in the line. When valve V-5A is opened the hydrogen passes through line B1 to line C1 and into open valve V-8A. Hydrogen pressure is measured by a pressure transmitter PT-7A and the hydrogen passes through a breakaway check valve V-9A which is designed to break off and seal the hydrogen flow line C1 should there be a problem external to the flow of hydrogen. The hydrogen flow continues through open valve V-10A and continues through the dispenser into the vehicle through line D1. Position indicator ZS-11A enables the dispenser system to be active. No automated valves may open unless this device is in the correct position. By integrating this valve block, the number of fittings in the dispensing system is reduced and safety increased because of the reduction in total number of potential leak points. This also enables the use of the one temperature measurement device. Further by integrating a cartridge valve into the valve block, the entire block does not need removal from the dispensing system when service or maintenance is required.

During normal operation, the valve block will have valve V-4A open and fluid will dispense in an ordinary manner to the dispenser D11. Valves V-4B and 5B will remain closed (one or more valves that are closed off). Should the operator wish to expand the system to provide for two dispensers or to expand the dispensing means, then valves V-4B and 5B will be opened and fuel can be fed to dispenser D2.

In the situation where there are two dispensers of hydrogen referred to above, the hydrogen from line A is split after filter F-2 by line 1 and fed in part to open valves V-4B and 5B (the second valve block "SVB"). Line 1 is a means to expand the valve block from one valve block to two valve blocks. The hydrogen flow continues through line B2 to line C2 and open valve V-8B. This line is typically a length of tubing that is made from a material sturdy enough to withstand outside conditions as well as being able to contain hydrogen. Pressure transmitter PT-7B measures the pressure of the hydrogen before it is fed through breakaway check valve V-9B which operates in the same manner as breakaway check valve V-9A. The hydrogen will pass through open valve V-10B and pass through line D2 into the vehicle being fueled. Position switch ZS-11B enables the dispenser to be active. No automated valves may be open unless this device is in the correct position.

Both dispensers are connected to a line through valve V-3 that is periodically opened to allow for pressure balancing the system by feeding hydrogen to the atmosphere or for system maintenance. It is noted that when the dispensing system comprises two dispensers that each can operate at a pressure different from the other.

When a vehicle that is going to be fueled arrives at the dispensing station, water may be present in the fuel tank as a result of the operation of the vehicle. When water is detected in the vehicles, a pump P-13 on instructions from water hose position switch ZS-12A will pump water from the vehicles to a water holding tank T-14. In a two dispenser operation, water from a second vehicle will be drawn through line E2 and water hose position switch ZS-12B by the pump P-13 and will be fed through line E2 to line E1 where it will join with the water from a first vehicle in being pumped into holding tank T-14. A water removal pump P-15 can be operated from time to time to remove the water from the holding tank T-14 and the water can be disposed of in an environmentally friendly manner. This is another improvement over prior systems as only a single water removal system need be employed in terms of the pumps necessary to remove water.

An operator panel O operates to control the signals that are sent to the individual dispensing systems telling them to open various valves and receiving information such as the temperature and pressure of the hydrogen flowing through the dispensing system. The ground and data connection F1 for the first dispenser grounds through line C-16A and the ground and data connection F2 on the second dispenser ground through line C-16B. This operator panel O reflects an improvement as it can control two dispensing systems where previously two operator panels were necessary to control the two dispensers.

Due to the nature of the dispenser construction, should the need user need to expand the dispensing to more than two dispensers, the additional components could be fitted without necessarily building a new dispensing system. The original system can be built with points capped off and ready to be added onto if and when a third or fourth dispenser system is desired.

The dispensing system of the invention can be used for fluids beyond hydrogen including compressed natural gas, biogas and mixtures of hydrogen and other gases without any substantial retrofitting. The appropriate temperatures and pressures of the other fluids can be controlled to ensure proper dispensing of these fluids.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A hydrogen dispensing system comprising: a source of hydrogen fluidly connected to a valve block comprising one or more valves for controlling the flow of hydrogen in electronic communication with a programmable logic controller for controlling the flow of hydrogen between the valve block and a dispenser wherein the dispenser comprises a hose assembly for delivering hydrogen to a vehicle and an expander fluidly connected to the dispenser to expand the dispenser to two or more dispensers and a pump fluidly connected to the vehicle for water removal from the vehicle.

2. A method for feeding hydrogen to a vehicle comprising the steps: Feeding hydrogen to a valve block comprising one or more valves for controlling hydrogen flow wherein said valve block is in fluid communication with a second valve block and a dispenser wherein the second valve block comprises one or more valves for controlling hydrogen flow; Opening the one or more valves in the valve block to allow for the passage of hydrogen to said dispenser while maintaining the one or more valves in the second valve block closed; and Feeding hydrogen from said dispenser to said vehicle.

3. The method as claimed in claim 2 wherein a programmable logic controller controls the flow of hydrogen between said one or more valves in the valve block and said dispenser.

4. The method as claimed in claim 2 wherein said dispenser is a hose assembly for delivering hydrogen to a vehicle.

5. The method as claimed in claim 2 further comprising a pump system for removing water from a vehicle.

6. The method as claimed in claim 2 further comprising opening said one or more valves in the second valve block and providing hydrogen to a second dispenser.

* * * * *